(12) United States Patent
Machnicki et al.

(10) Patent No.: US 8,468,373 B2
(45) Date of Patent: Jun. 18, 2013

(54) MODIFYING PERFORMANCE PARAMETERS IN MULTIPLE CIRCUITS ACCORDING TO A PERFORMANCE STATE TABLE UPON RECEIVING A REQUEST TO CHANGE A PERFORMANCE STATE

(75) Inventors: Erik P. Machnicki, San Jose, CA (US); Timothy J. Millet, Mountain View, CA (US); Josh P. de Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 241 days.

(21) Appl. No.: 13/006,967

(22) Filed: Jan. 14, 2011

(65) Prior Publication Data

US 2012/0185703 A1 Jul. 19, 2012

(51) Int. Cl.
*G06F 1/00* (2006.01)
(52) U.S. Cl.
USPC .......................................... 713/300; 713/322
(58) Field of Classification Search
USPC .................................................. 713/132, 322
See application file for complete search history.

(56) References Cited

U.S. PATENT DOCUMENTS

| | | | |
|---|---|---|---|
| 4,344,132 A * | 8/1982 | Dixon et al. ..................... | 710/60 |
| 5,813,022 A | 9/1998 | Ramsey et al. | |
| 6,128,747 A | 10/2000 | Thoulon | |
| 6,247,082 B1 * | 6/2001 | Lo et al. .......................... | 710/105 |
| 6,510,525 B1 | 1/2003 | Nookala et al. | |
| 6,535,798 B1 | 3/2003 | Bhatia et al. | |
| 6,665,802 B1 | 12/2003 | Ober | |
| 6,823,516 B1 | 11/2004 | Cooper | |
| 7,337,335 B2 | 2/2008 | Jorgenson et al. | |
| 7,369,815 B2 | 5/2008 | Kang et al. | |
| 7,475,320 B2 * | 1/2009 | Knebel et al. ................. | 714/746 |
| 7,590,473 B2 | 9/2009 | Wyatt | |

(Continued)

FOREIGN PATENT DOCUMENTS

| | | |
|---|---|---|
| EP | 0855718 A1 | 7/1998 |
| GB | 2472050 A | 1/2011 |

(Continued)

OTHER PUBLICATIONS

U.S. Appl. No. 12/756,006, filed Apr. 7, 2010, all pages.

(Continued)

*Primary Examiner* — Thomas Lee
*Assistant Examiner* — Robert Cassity
(74) *Attorney, Agent, or Firm* — Lawrence J. Merkel; Meyertons, Hood, Kivlin, Kowert & Goetzel, P.C.

(57) ABSTRACT

Systems and methods for coordinating performance parameters in multiple domains are described. In an embodiment, a method includes receiving a request to change a state of an electronic circuit, where the circuit includes a first domain and a second domain, causing a first parameter of a first circuit serving the first domain to be modified to a first modified parameter based on the request, and causing a second parameter of a second circuit serving the second domain to be modified to a second modified parameter based on the request. In some cases, a parameter may include a clock frequency. In other cases, a parameter may include a voltage. In some embodiments, a system may be implemented as a logic circuit and/or as a system-on-a-chip (SoC). Devices suitable for using these systems include, for example, desktop and laptop computers, tablets, network appliances, mobile phones, personal digital assistants, e-book readers, televisions, and game consoles.

17 Claims, 5 Drawing Sheets

U.S. PATENT DOCUMENTS

| | | | |
|---|---|---|---|
| 7,624,295 B2 | 11/2009 | Taketoshi et al. | |
| 7,949,887 B2 * | 5/2011 | Gunther et al. | 713/320 |
| 8,020,017 B2 | 9/2011 | Padhye et al. | |
| 8,069,358 B2 * | 11/2011 | Gunther et al. | 713/320 |
| 2002/0188828 A1 | 12/2002 | Sugimoto | |
| 2003/0061383 A1 | 3/2003 | Zilka | |
| 2005/0024105 A1 * | 2/2005 | Agrawal et al. | 327/156 |
| 2005/0064829 A1 | 3/2005 | Kang et al. | |
| 2006/0259800 A1 | 11/2006 | Maejima | |
| 2007/0150759 A1 | 6/2007 | Srinivasan et al. | |
| 2007/0156370 A1 * | 7/2007 | White et al. | 702/132 |
| 2007/0234078 A1 | 10/2007 | Nguyen | |
| 2008/0094109 A1 * | 4/2008 | Farjad-rad et al. | 327/99 |
| 2008/0168285 A1 | 7/2008 | de Cesare et al. | |
| 2008/0307245 A1 | 12/2008 | de Cesare et al. | |
| 2009/0063715 A1 | 3/2009 | de Cesare et al. | |
| 2009/0144578 A1 * | 6/2009 | Tatsumi | 713/340 |
| 2009/0204835 A1 | 8/2009 | Smith et al. | |
| 2009/0204837 A1 | 8/2009 | Raval et al. | |
| 2010/0023792 A1 * | 1/2010 | Tsuji | 713/400 |
| 2010/0211700 A1 | 8/2010 | de Cesare et al. | |
| 2011/0078463 A1 | 3/2011 | Fleming et al. | |

FOREIGN PATENT DOCUMENTS

| | | |
|---|---|---|
| JP | 2001-238190 | 8/2001 |
| JP | 2003-108260 | 4/2003 |
| JP | 2004-303206 | 10/2004 |

OTHER PUBLICATIONS

International Search Report and Written Opinion from PCT/US2012/020440 dated May 7, 2012.

Non-Final Office Action in related U.S. Appl. No. 12/756,006, Feb. 24, 2012, pp. 1-12.

Non-Final Office Action in related U.S. Appl. No. 13/590,217, Nov. 19, 2012, pp. 1-7.

Office Action and translation thereof in Japanese Patent Application No. 2012-019060, mailed Dec. 27, 2012, pp. 1-3.

Japanese Patent Application No. 2002366351, published Dec. 20, 2012, applicant NEC Corp., entitled "Super-Scalar Processor".

Japanese Patent Application No. 2005128937, published May 19, 2005, applicant Matsushita Electric Ind. Co. Ltd., entitled "Processor System, Instruction Stream Optimization Device, and Instruction Stream Optimization Program".

Japanese Patent Application No. 2008524744, published Jul. 10, 2008, applicant Packet Digital, entitled "Method and apparatus for on-demand power management".

\* cited by examiner

MODIFYING PERFORMANCE PARAMETERS IN MULTIPLE CIRCUITS ACCORDING TO A PERFORMANCE STATE TABLE UPON RECEIVING A REQUEST TO CHANGE A PERFORMANCE STATE

BACKGROUND

1. Field of the Invention

This disclosure is related to the field of computer systems, and more particularly to systems and methods for coordinating performance parameters in multiple circuits.

2. Description of the Related Art

As the number of transistors built into integrated circuits or "chips" continues to increase, the importance of power management becomes more evident. Indeed, power management is generally a critical requirement in the design of many electronic devices. For example, in the case of portable devices, power management techniques can increase battery life and therefore the usefulness of the product. Moreover, even in cases where a particular device does not operate on battery, managing power consumption can have numerous benefits. For example, in addition to lessening energy consumption, power management can reduce heat generated by a given device, which in turn ameliorates its cooling requirements.

As part of managing power and performance tradeoffs in an integrated circuit, the performance states of various components on the integrated circuit can be changed. For example, the clock frequencies of clocks used by the various components can be changed. Managing the changes over multiple components can be difficult to implement correctly.

SUMMARY

This specification discloses systems and methods that may be employed in various environments, including, for example, in connection with computing devices that implement power management mechanisms. In some embodiments, systems and methods disclosed herein may be implemented in a system-on-a-chip (SoC) or application-specific integrated circuit (ASIC) such that several hardware components may be integrated within a single circuit. Examples of electronic devices suitable for using these systems and methods include, but are not limited to, desktop computers, laptop computers, tablets, network appliances, mobile phones, personal digital assistants (PDAs), e-book readers, televisions, video game consoles, etc.

In some embodiments, a method may include receiving a request to change the state of circuit, component, or device, where the circuit has two or more performance domains. These two or more performance domains may include areas of the circuit, component, or device that may be configured to operate at different performance levels. The ability to switch between various performance levels or states may be provided by a power management mechanism. For example, when the device is in a first state, a first performance domain may operate with a first clock frequency or voltage, while a second performance domain operates with a second clock frequency or voltage. And when the device is in a second state, these performance domains may operate with modified frequencies or voltages. Other parameters of the performance domains may also be changed.

Upon receipt of the stage change request, the method may include, for example, modifying the first frequency of a first clock serving the first performance domain to a first modified frequency, and modifying a second frequency of a second clock serving the second performance domain to a second modified frequency. In some embodiments, the second modified frequency may be independent from the first modified frequency. In other embodiments, the second modified frequency may be different from, and other than a multiple of, the first modified frequency.

In certain embodiments, the stage change request may include a value or indication that is written to a single register, and which may then be used look-up or otherwise derive configuration parameters used for switching the first and second frequencies to the first and second modified frequencies (or voltages), respectively. In one example, the method may access a performance state table that is indexed by the indication and that includes configuration parameters used by a particular set of clock generators that provide clock signals to their corresponding performance domains. In another example, a performance state table may include configuration parameters used by a particular set of voltage supplies that provide voltages to their corresponding performance domains. The performance state table may include various other configuration parameters as well.

In some embodiments, modifying a clock frequency may involve instructing a clock generator to reconfigure a clock input from a first input or source to a second input or source. In other embodiments, modifying the clock frequency may involve instructing a clock generator to reconfigure a clock divisor. In yet other embodiments, modifying a voltage may involve instructing a power supply circuit to switch to a different input or output. In each of these embodiments, a performance state table may also indicate the underlying instructions (e.g., a selected source, divisor value, etc.) that cause the clock generator or voltage supply circuit to change its mode of operation.

Accordingly, the use of a performance state table may, in some cases, allow software to cause a particular circuit or performance domain to enter a desired performance state without the software having to provide and/or manage specific configuration parameters required to effect certain underlying changes. In other cases, the performance state table may store, for a given state of a device, various configuration parameters to place each of the device's performance domains or circuits within a suitable or desired state. As a result, software may cause the entire device (or a subset thereof) to enter a given state at once, with a reduced number of commands.

In some embodiments, a system-on-chip (SoC) includes a processor and a logic circuit coupled to the processor. The logic circuit is configured to derive a first frequency and a second frequency in response to a request to put the SoC in a given state, where the second frequency is independent from the first frequency. The logic circuit is also configured to cause a first clock circuit serving a first domain of the SoC to provide the first clock at the first frequency, and to cause a second clock circuit serving a second domain of the SoC to provide the second clock at the second frequency.

In other embodiments, a logic circuit includes a power management circuit configured to: receive a request to change a state of a device having a first performance domain and a second performance domain, cause a first parameter of a first circuit serving the first performance domain to be modified to a first modified parameter, and cause a second parameter of a second circuit serving a second performance domain to be modified to a second modified parameter. In some cases, the second modified parameter may be independent from the first modified parameter. These parameters may be a clock frequency, a voltage, a combination thereof, and/or other parameters. The logic circuit may also include one or more programmable registers coupled to the power management circuit and configured to enable one or more operations of the power management circuit.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, ¶6 interpretation for that unit/circuit/component.

DETAILED DESCRIPTION OF EMBODIMENTS

In some embodiments, a power management unit or circuit may be provided within an electronic device. The electronic device may be, for example, a desktop computer, a laptop computer, a tablet, a network appliance (e.g., gateway, router, access point, etc.), a mobile phone, a personal digital assistant (PDA), an e-book reader, a television, a video game console, or any other suitable electronic device. As such, the device may also include other circuits or subsystems such as, for example, processors, peripherals, controllers, etc. Moreover, two or more of these circuits (or groups of circuits) may constitute different performance domains that are capable of operating at varying performance levels. Accordingly, in some embodiments, the power management unit may perform methods for coordinating system parameters in multiple performance domains. Specifically, the power management unit may include a performance state table having multiple entries. Each entry may specify configuration parameters for two or more performance domains. A register or registers may be programmed to point to one of the entries in the table, and the power manager may cause the performance domains to operate at the performance states specified in the selected entry.

Figure 1:
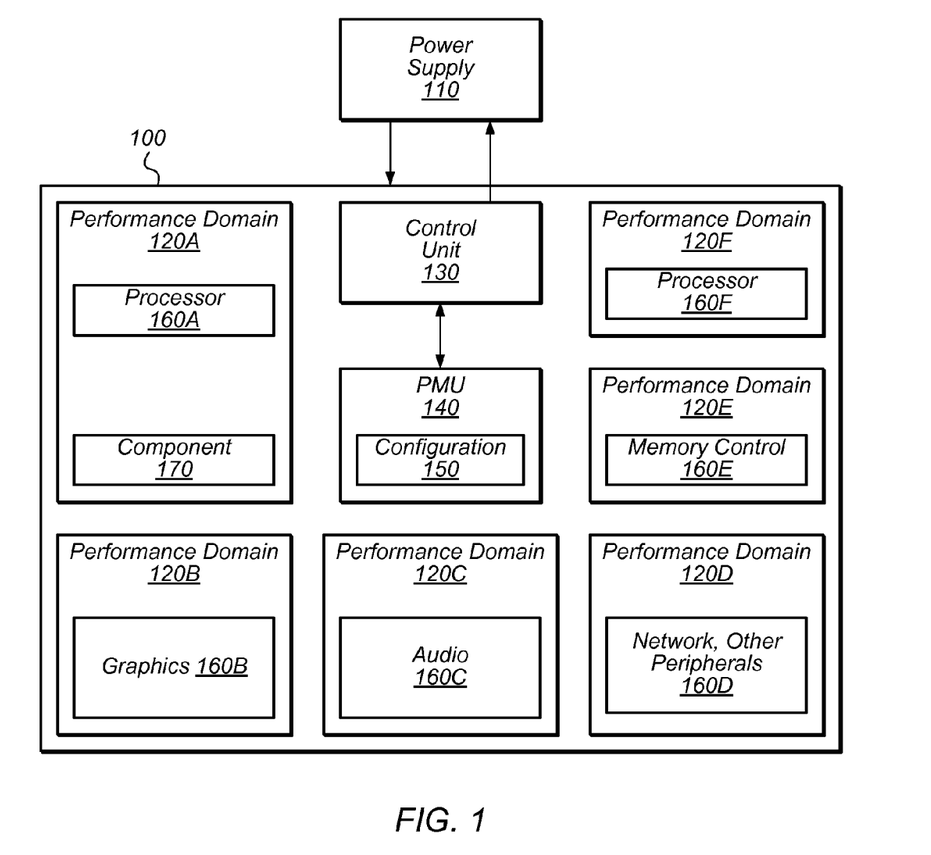
FIG. 1 is a block diagram of a system according to certain embodiments.

Turning to FIG. 1, a block diagram of a system is shown according to certain embodiments. As illustrated, the system includes an integrated circuit (IC) 100 forming a system-on-a-chip (SoC) or application-specific integrated circuit (ASIC) coupled to power supply 110. Integrated circuit 100 includes a set of performance domains 120A-F. Each performance domain 120A-F includes at least one subsystem, circuit, or component, and a given performance domain may include more than one component. For example, performance domain 120A includes two components—processor 160A and another component 170 (e.g., a coherency controller, or the like)—and performance domain 120D may include two or more networking or other peripherals 160D. In the depicted embodiment, performance domain 120B includes graphics subsystem 160B, performance domain 120C includes audio subsystem 160C, performance domain 120E includes memory control circuit 160E, and performance domain 120F includes optional second processor 160F. Integrated circuit 100 also includes power management unit (PMU) 140, which in turn includes one or more performance configuration registers 150. PMU 140 is coupled to clock and/or voltage control unit (control unit) 130, which in turn is coupled to power supply 110.

Components within integrated circuit 100 may be coupled to each other using any suitable bus and/or interface mechanism. PMU 140 and control unit 130 may also be coupled to performance domains 120A-F in addition to being coupled to their respective interfaces. For example, the control unit 130 may supply clock signals to one or more of performance domains 120A-F. Additionally or alternatively, control unit 130 may interact with power supply 110 to request that one or more supply voltages be supplied to one or more of performance domains 120A-F. In embodiments where integrated circuit 100 resides within a portable device, power supply 110 may be a battery or the like.

PMU 140 may be configured to control transitions between performance states for the various performance domains 120A-F. For example, the PMU 140 may be configured to automatically transition one or more of performance domains 120A-F to different performance states. Each entry in a performance state table in the PMU 140 may be programmed with a combination of performance states for various performance domains, and software may write a register or registers to select one of the entries. The PMU 140 may be configured to coordinate the transition of the performance domains to the performance states indicated in the selected entry.

In some embodiments, a performance domain may be a set of components controlled by PMU 140 as a unit for performance configuration purposes. That is, PMU 140 may be configured to establish a corresponding performance state for each performance domain, and may be configured to control transitions between performance states in each performance domain. As such, components that form a performance domain may transition together from one performance state to another performance state. In other embodiments, components in different performance domains may be independent of each other, at least from the standpoint of hardware, and may have independently-determined performance states. Some performance domains may be logically linked at a higher level (e.g., in software). For example, domains 120C and 120D may be logically linked in terms of their performance states if a user is watching a video that includes sound (thus simultaneously using graphics subsystem 160B to display video images and audio subsystem 160C to reproduce the accompanying sound).

A given performance state may include any combination of configuration parameters for the components in a corresponding performance domain. A configuration parameter may be any selectable setting for a component that affects the performance of that component. For example, the operating frequency of a clock signal provided to a component or performance domain may affect its performance and is thus considered a configuration parameter because, for instance, a lower operating frequency may result in lower performance (and also less power consumption). As another example, a supply voltage provided to a performance domain may affect its performance and may also be a configuration parameter.

Some configuration parameters may be component-specific. Examples of such configuration parameters include, but are not limited to, cache sizes in various caches, a data width or other data transfer rate parameter of an interface, a number of symmetrical units that are active among units that operate in parallel (e.g., execution units in a processor, pixel pipelines or other image processing pipelines in a graphics unit, etc.), a number of instructions, operations, communications, and/or memory requests processed per unit of time, a graphics resolution or size of a color palette, an audio resolution and sampling rates, memory bandwidth, the sleep/wake state of a processor, etc. Moreover, if components or portions thereof are power-gated and/or clock-gated, the power and/or clock enables may be configuration parameters. In some embodiments, a configuration parameter may include one or more registers that provide information to a memory controller (e.g., 160E) of which performance state one or more performance domains are in. In short, any parameter that may be changed and that may affect operation or performance of a component or performance domain may be considered a configuration parameter in various embodiments.

Changing the performance state in a performance domain may affect the power consumption of the performance domain. For example, reducing operating frequency and/or supply voltage typically have direct effects on power consumption. Reducing cache size may reduce power consumption because a portion of the cache may not need to be accessed, and even more reduction may be realized if the unused portion may be turned off. Furthermore, reducing cache size may reduce cache hit rates, which may increase memory latency to the consumer. Increased memory latency may reduce activity in the consumer, reducing power consumption. Reducing data transfer widths/rates on interfaces may reduce power consumption through reduced switching. Additionally, reducing the rate at which data is supplied to a consumer may reduce activity in the consumer, which may reduce power consumption in the consumer. Reducing parallel activity in symmetrical units may reduce power consumption through reduced activity. Reducing graphics/audio resolution and color palette may reduce the amount of data transferred per image or unit of sound. Further, reducing memory bandwidth may reduce power consumption in accessing the memory per unit time, and may reduce activity in the consumer.

In some embodiments, PMU 140 may be a logic circuit or the like. As such, PMU 140 may comprise standard electronic components such as bipolar junction transistors (BJTs), field-effect transistors (FETs), other types of transistors, logic gates, operational amplifiers (op amps), flip-flops, capacitors, diodes, resistors, and the like. Configuration registers 150 may be programmed to store settings used by PMU 140 to implement particular functions and/or to enter specified modes of operation. These and other components may be arranged in a variety of ways and configured to perform the various operations described herein.

Particularly, PMU 140 may include circuitry configured to cause the performance state transitions to occur in performance domains 120A-F. In one embodiment, software may explicitly communicate the desired performance state changes to the PMU 140 (e.g. in the form of an indication that selects a performance state table entry). The PMU 140 may access the selected entry, and may be configured to establish the desired performance states specified in the selected entry.

In the case where performance states or levels are reached by making voltage and/or clock frequency changes, PMU 140 may communicate new voltage and/or frequency settings to the control unit 130. Control unit 130 may implement these new settings, generate the clocks at the requested frequencies and/or request the desired supply voltages from the power supply 110. Control unit 130 may order the modifications, if necessary, to safely make the transitions. For example, if both the clock frequency and supply voltage are being increased in any particular performance domain, it may be safer to increase the voltage first, and then increase the clock frequency because the increased clock frequency may lead to incorrect operation if circuitry is operating more slowly at the current (lower) supply voltage. In some embodiments, the amount of time that elapses in a supply voltage change may be substantially greater than the time to change the clock frequency. If the clock frequency and supply voltage are being decreased, the clock frequency may be reduced first (or the frequency and voltage may be reduced in parallel, since the lower clock frequency may be reached prior to the lower supply voltage in this case).

Control unit 130 may include circuitry to communicate with power supply 110 to request the desired supply voltages, and it may also include dynamic clock generation circuitry. For example, control unit 130 may include one or more phase locked loops (PLLs), multiplexers, clock dividers/multipliers, etc. to dynamically generate clock signals for the various components or performance domains of integrated circuit 100. In one arrangement, one or more oscillators drive one or more PLLs, which then generate the base clocks for major portions of integrated circuit 100. The PLL outputs drive a number of dynamic clock generators, which serve to generate individual clocks for the various regions or performance domains of the chip. Each clock generator or circuit may include a multiplexer and/or a divider coupled to the multiplexer. In operation, the multiplexer may allow selection of a particular clock signal at the input of the generator, and the divider may further reduce (or increase) the frequency of the selected signal to obtain a desired frequency. In some embodiments, certain generators may comprise only a multiplexer, and others may comprise only a divider. Further, each generator may be enabled and disabled independently, and may operate in a glitch-free manner or "on-the-fly." In some cases, to facilitate glitch-free operation, a given generator may require that sources being switched to and from both be running (or active) before the selection is made.

Still referring to FIG. 1, processors 160A and/or 160F may implement any instruction set architecture, and may be configured to execute instructions defined in that instruction set architecture. Any micro-architectural implementation may be used (e.g., in order, out of order, speculative, non-speculative, scalar, superscalar, pipelined, super-pipelined, etc.). Micro-coding techniques may be used in some embodiments, in combination with any of the foregoing.

Graphics unit or subsystem 160B may include circuitry involved in the display of images on a display device. The produced images may be static images, or may be part of a video. Graphics unit 160B may include rendering hardware, refresh (of the display device) hardware, video encoders and/or decoders, video compression and decompression units, etc. Audio unit or subsystem 160C may include circuitry involved in the playing or recording of sounds in the system. Audio unit 160C may include, for example, audio encoders and/or decoders, digital signal processors, etc.

Networking peripherals and other peripherals 160D may include a variety of circuitry. For example, networking peripherals may include a media access controller (MAC) unit for the supported network, as well as physical layer circuitry. Other peripherals may include any other desired peripherals, and/or peripheral interface controllers configured to control off-chip peripheral interfaces such as Peripheral Component Interconnect (PCI), PCI express (PCIe), firewire, Universal Serial Bus (USB), etc.

Memory controller 160E may be configured to access memory devices such as dynamic random access memory devices (DRAM), synchronous DRAM (SDRAM), double data rate (DDR, DDR2, DDR3, DDR4, etc.) SDRAM, low power DDR (LPDDR2, etc.) SDRAM, RAMBUS DRAM (RDRAM), etc. In one embodiment, memory controller 160E may be configured to interface to one or more memory modules (e.g., single inline memory modules (SIMMs), dual inline memory modules (DIMMs), etc.) that include one or more of the memories. Accordingly, memory controller 160E may be configured to communicate on the memory interfaces, to queue memory requests from other components in integrated circuit 100, and/or to communicate with the other components to fulfill memory read and write operations.

While the embodiment of integrated circuit 100 shown in FIG. 1 includes numerous performance domains, more or fewer performance domains may be supported. Any combination of performance domains and components included in those domains may be implemented in various embodiments.

Other embodiments of integrated circuit 100 may include other combinations of components, including any subset the illustrated components with or without other components, supersets with other components, etc. Additionally, while the illustrated embodiment illustrates the components 160A-F and 170 all included in the integrated circuit 100, other embodiments may implement the components as two or more integrated circuits. Additionally or alternatively, at least portions of power supply 110 may be included within integrated circuit 100. In fact, any suitable level of integration or discrete components may be used.

As previously noted, PMU 140 may be configured to control transitions between performance states for the various performance domains 120A-F. In some embodiments, a request to switch from a given performance state to another includes a value or indication that is written to one or more registers, and which may then be used by PMU 140 to look-up or otherwise derive configuration parameters for entering the desired performance state. In one example, the method may access a performance state table that is indexed by the value written to the register(s) and includes configuration parameters used by a particular set of clock generators that provide clock signals to their corresponding performance domains. In another example, a performance state table includes configuration parameters used by a particular set of voltage supplies that provide voltages to their corresponding performance domains. The performance state table may further include various other configuration parameters as discussed above.

As a non-limiting illustration, consider a situation where both clock frequencies and voltages are configuration parameters that may be set for each of the performance domains (e.g. domains 1 through m). If n states are available in the performance state table (i.e. there are n entries in the table), then a possible performance state table may b configured as follows:

TABLE I

|  | Domain 1 | Domain 2 | ... | Domain m |
|---|---|---|---|---|
| state 1 | $f_{1,1}; V_{1,1}$ | $f_{2,1}; V_{2,1}$ | ... | $f_{m,1}; V_{m,1}$ |
| state 2 | $f_{1,2}; V_{1,2}$ | $f_{2,2}; V_{2,2}$ | ... | $f_{m,2}; V_{m,2}$ |
| state 3 | $f_{1,3}; V_{1,3}$ | $f_{2,3}; V_{2,3}$ | ... | $f_{m,3}; V_{m,3}$ |
| ... | ... | ... | ... | ... |
| state n | $f_{1,n}; V_{1,n}$ | $f_{2,n}; V_{2,n}$ | ... | $f_{m,n}; V_{m,n}$ |

In this embodiment, if software desires to set the frequencies (f) and/or voltages (V) for each domain in integrated circuit 100, for example, the software may write a pointer to the corresponding entry (1 to n) in the performance state table to configuration register 150 of PMU 140. The PMU 140 may read the selected entry and communicate selected clock frequencies and/or voltages to the control unit 130. The control unit 130 may then coordinate changes to the various frequencies and/or voltages of each domain without further intervention and/or management by software. As a result, in some cases, different portions of integrated circuit 100 may alternate between their various different states with a single command or register write. In other words, from the perspective of the user and/or software, changes between states are performed atomically (even in situations where the actual underlying hardware changes are made in parallel) and with a high level of abstraction (e.g., the requesting software does not need to program each clock generator individually and/or understand how each generator is configured).

Furthermore, by using a performance state table such as the one illustrated in Table I above, each performance domain may have its parameters changed independently. For example, in the case of clock frequencies, the frequencies in each frequency domain for any given state may be different from each other, and may be other than a multiple of each other. As noted before, configuration parameters other than clock frequency and voltage may populate the table in other embodiments. Additionally, an embodiment in which only clock frequencies are included in the table is contemplated.

In some embodiments, each entry of the performance state table may be an actual configuration parameter—e.g., $f_{2,3}$ may be a clock frequency, $V_{2,3}$ may be a voltage magnitude, etc. In other embodiments, however, each entry in the performance state table may contain one or more underlying settings that a circuit (e.g., control unit 130) may use in order to provide the desired configuration. As an example, if performance domain 2 is served by a clock generator that includes a multiplexer and a divider, then $f_{2,3}$ may include source selection and divider settings usable by the clock generator to provide the desired frequency to performance domain 2.

Figure 2:
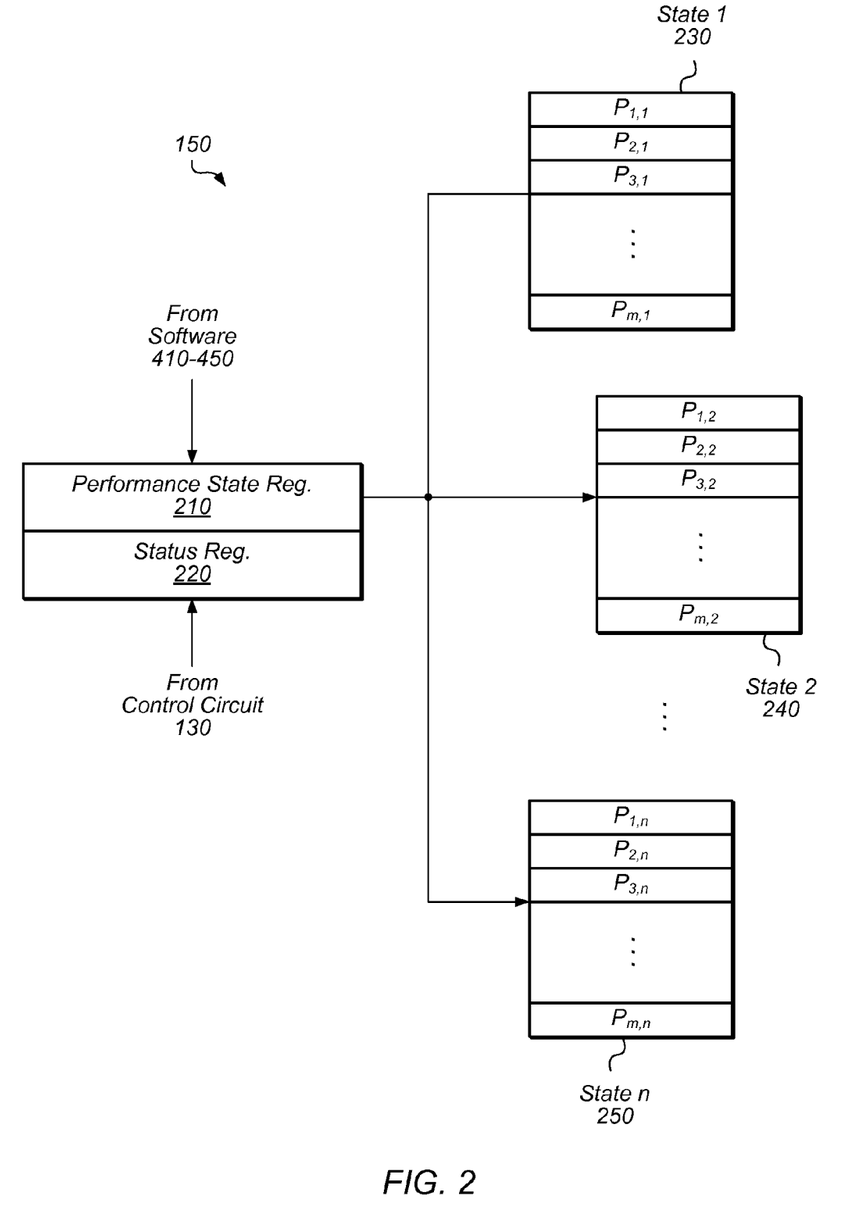
FIG. 2 is a diagram of an implementation of a performance state table according to certain embodiments.

Turning now to FIG. 2, a diagram of an implementation of a performance state table is depicted according to certain embodiments. The performance state table may be programmed within configuration registers 150 of PMU 140, for example, and it is one of many possible ways of representing Table I (shown above) in hardware. As illustrated, configuration registers 150 include one or more performance state registers 210 and one or more state registers 220, as well as a plurality of registers 230-250 containing configuration parameters (1 though n) of various performance domains (1 through m) for each programmable state. Although shown as separate components, in other embodiments two or more of registers 210-250 may be combined.

Performance state registers 210 may control which of registers 230-250 (and thus which performance state) is currently active. For purposes of illustration, consider a scenario where software desires to set the operation of integrated circuit 100 to state 2. The software may write the value corresponding to state 2 to into performance state register 210, and PMU 140 may then select parameters $P_{1,2}, \ldots P_{m,2}$ from register 240. Each of parameters $P_{1,2}$ through $P_{m,2}$ may correspond to a configuration parameter of a respective performance domain 1 through m. As noted before, parameters $P_{1,2}, \ldots P_{m,2}$ may be clock frequencies, voltage magnitudes, or the like. Additionally or alternatively, any given parameter may include settings suitable for instructing the circuit providing the clock frequency, voltage, etc. to a respective performance domain. In any event, PMU 140 may provide the identified parameters to control unit 130, which may then implement the changes in hardware (e.g., switch a multiplexer, etc.).

In an alternative embodiment, each of registers 230-250 may contain parameters for each state of a single performance domain (to the exclusion of other performance domains). For example, $P_{1,1}$ within register 230 may represent a configuration parameter for state 1 of performance domain 1, $P_{1,2}$ may be a configuration parameter for state 2 of that same performance domain—i.e., performance domain 1—and so on. Similarly, register 240 may contain all configuration parameters for each state of performance domain 2, and register 250 may contain all configuration parameters for each state of performance domain n. In this embodiment, performance state register 210 may identify each entry of each within registers 230-250 for each performance domain that corresponds to a requested performance state, and provide those configuration parameters to control unit 130.

Configuration registers 150 may also include status register(s) 220. For example, when configuring clock parameters, each dynamic clock generator within control unit 130 may include a register that shows a "pending" value during a change in its configuration, and this same value may be copied to state register 220. In some embodiments, this allows PMU 140 or software to wait for all changes due to a change in performance state register 210 to take effect by polling on a single register—i.e., state register 220. In an alternative embodiment, performance state register 210 may be changed without waiting for all the pending bits of status register 220 to clear. Control unit 130 ensures that the final clock configuration matches the last performance state register 210 value written, but the dynamic clock generators may be in intermediate configurations for some time.

Figure 3:
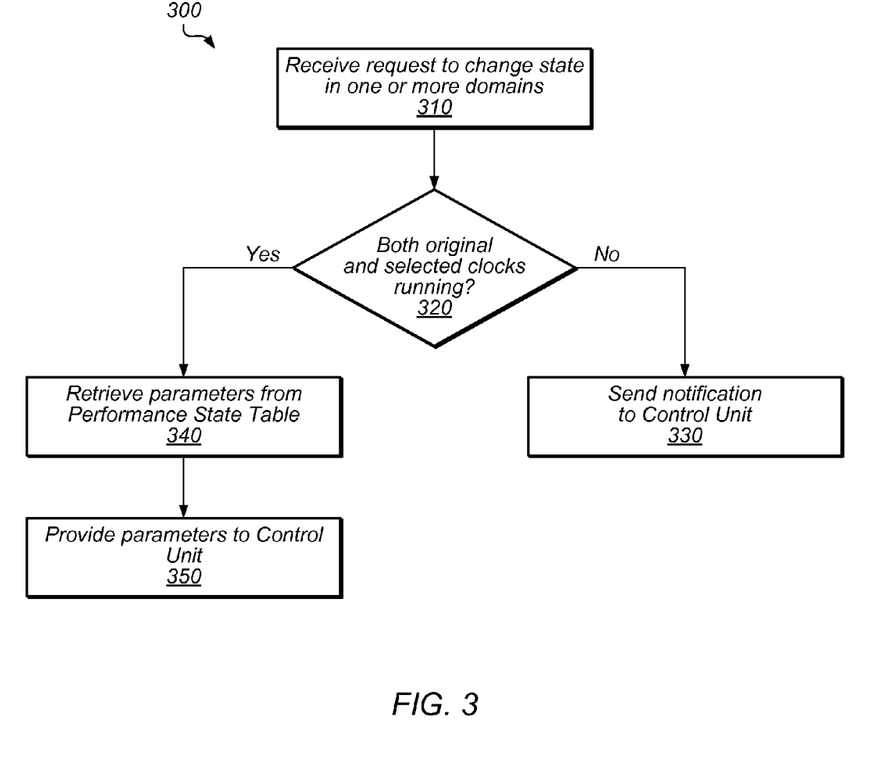
FIG. 3 is a flowchart representing a method for coordinating system parameters according to certain embodiments.

Referring to FIG. 3, a flowchart representing a method for coordinating parameters is depicted according to certain embodiments. In some embodiments, method 300 may be performed by PMU 140 of FIG. 1. At 310, PMU 140 receives a request to change a state in one or more performance domains 120A-F of integrated circuit 100. The request may be determined based on the value of performance state register 210 of configuration registers 150 within PMU 140. In the case of a clock frequency change where a corresponding clock generator of control circuit 130 includes a multiplexer, for example, at 320 PMU 140 may determine whether both the original and newly selected clock inputs are running or active. If so, then at 340 PMU 140 may identify the parameters corresponding to the newly requested state from a state performance table. PMU 140 may then provide those parameters to control circuit 130 at 350, which may in turn implement hardware changes corresponding to the newly requested state. Otherwise, at 330 PMU 140 may request that control unit 130 activate both inputs before effecting the new state selection. In alternative embodiments, other suitable conditions may be checked at 320 prior to effecting a state change. For example, in the case of a voltage change, PMU 140 may determine at 320 whether a battery has a minimum amount of change, whether the portable device is "plugged in," etc.

Figure 4:
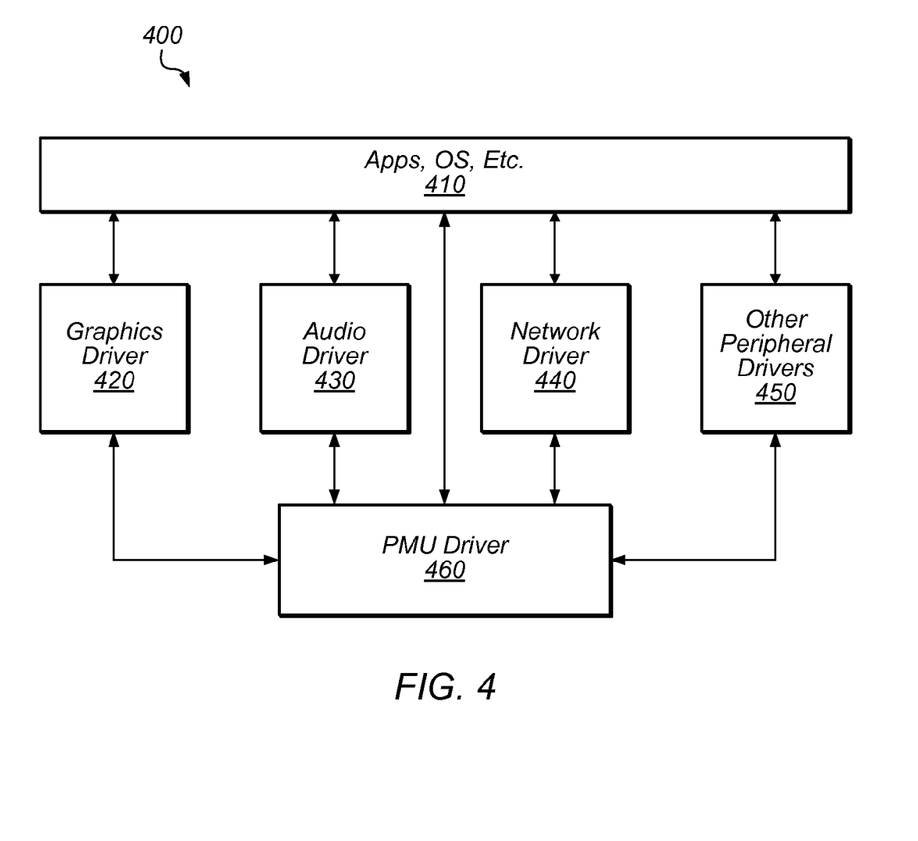
FIG. 4 is a diagram of a software environment according to certain embodiments.

Referring now to FIG. 4, a diagram of a software environment is shown according to certain embodiments. In some embodiments, operation of PMU 140 may be effected though PMU driver 140, which receives commands from a user and/or through other software 410-450. Particularly, software environment 400 may include one or more application programs, an operating system, or the like ("software") 410. Software 410 may interact with various drivers when using components of the system. For example, graphics driver 420 may be used to control graphics subsystem 160B, audio driver 430 may be used to control audio subsystem 160C, network driver 440 may be used for networking peripheral 160D, and other peripheral drivers 450 may be used for other peripherals. Also PMU driver 460 may be used to interact with PMU 140. Accordingly, if software 410 communicates with the graphics subsystem 160B, for example, it calls graphics driver 420 and so on. As such, each of drivers 420-460 may communicate with its corresponding components.

Additionally, each of drivers 420-450 may communicate with PMU driver 460. PMU driver 460 may monitor the activity in the components driven by the drivers 420-450 in a device activity table or the like. The monitored activities may include enabling and disabling the corresponding components. The monitored activities may further include changes to other performance characteristics of a particular unit. In some embodiments, based on the activities being monitored, the PMU driver 460 may select the performance state for each performance domain to be used in the various performance states. Additionally, other information may be coded into the device activity table (e.g., performance needs of various components when the processor is in the sleep state) which may affect the selected performance states as well.

In other embodiments, software 410 may also directly communicate with PMU driver 460. For example, in addition to the automatic performance state transitions performed for sleep and wake transitions of certain components, software 410 may also change performance states directly based on the activity in the system as a whole. That is, even if a processor is not going to the sleep state, for example, changes in the performance state of one or more performance domains may be desirable. Hence, software 410 may directly request such changes. In some embodiments, a computer accessible storage medium may incorporate embodiments of the systems and methods described herein.

Figure 5:
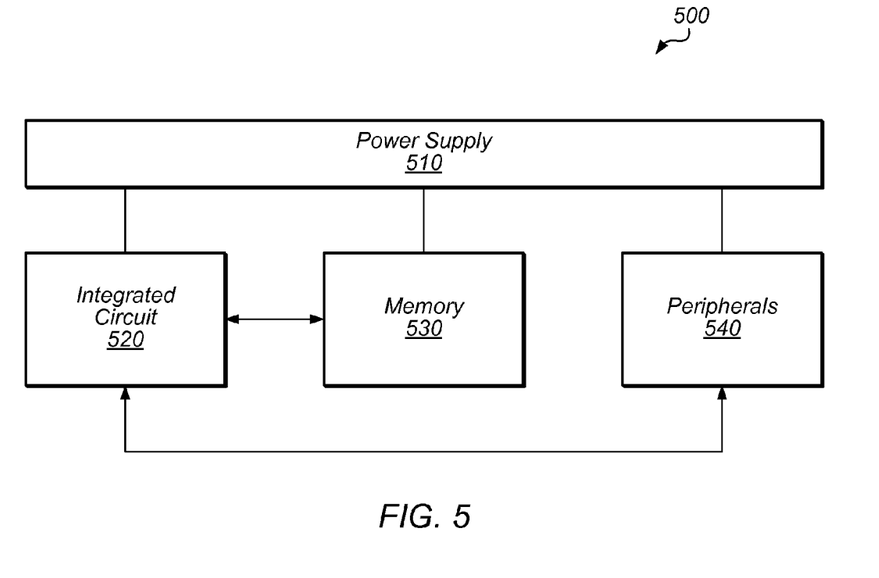
FIG. 5 is a block diagram of a computer system according to certain embodiments.

Turning next to FIG. 5, a block diagram of a system is shown. As illustrated, system 500 includes at least one instance of integrated circuit 520. Integrated circuit 520 may include one or more instances of elements within integrated circuit 100 of FIG. 1. In some embodiments, integrated circuit 520 may be a system-on-chip (SoC) or application specific integrated circuit (ASIC) including various additional circuitry such as memory controllers, video and/or audio processing circuitries, on-chip peripherals and/or peripheral interfaces to couple to off-chip peripherals, etc. Integrated circuit 520 is coupled to one or more peripherals 540 and external memory 530. Power supply 510 (shown as 110 in FIG. 1) is also provided which supplies the supply voltages to integrated circuit 520 as well as one or more supply voltages to memory 530 and/or peripherals 540. In some embodiments, more than one instance of the integrated circuit 520 may be included (and more than one external memory 530 may be included as well).

Peripherals 540 may include any desired circuitry, depending on the type of system 500. For example, in an embodiment, system 500 may be a mobile device (e.g., personal digital assistant (PDA), smart phone, etc.) and peripherals 540 may include devices for various types of wireless communication, such as Wi-fi, Bluetooth, cellular, global positioning system, etc. Peripherals 540 may also include additional storage, including RAM storage, solid state storage, or disk storage. Peripherals 540 may include user interface devices such as a display screen, including touch display screens or multitouch display screens, keyboard or other input devices, microphones, speakers, etc. In other embodiments, system 500 may be any type of computing system (e.g., desktop and laptop computers, tablets, network appliances, mobile phones, personal digital assistants, e-book readers, televisions, and game consoles).

External memory 530 may include any type of memory. For example, external memory 530 may include SRAM, non-volatile RAM (NVRAM, such as "flash" memory), dynamic RAM (DRAM) such as synchronous DRAM (SDRAM), double data rate (DDR, DDR2, DDR3, etc.) SDRAM, RAMBUS DRAM, etc., and/or any type of tangible memory. External memory 530 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

The invention claimed is:

1. A method comprising:
    receiving a request to change a state of circuit, wherein the circuit includes a first performance domain and a second performance domain, wherein the request identifies a first entry of a plurality of entries in a performance state table, wherein each entry of the plurality of entries is configured to store data describing performance states for at least the first performance domain and the second performance domain;
    determining a first modified frequency for a first clock serving the first performance domain and a second modified frequency for a second clock serving the second performance domain responsive to the data in the first entry, and wherein the data further specifies supply voltage magnitudes for the first performance domain and the second performance domain, and wherein the data further specifies at least one additional parameter for at least one of the first performance domain and the second performance domain;
    modifying a first frequency of the first clock serving the first performance domain to the first modified frequency responsive to determining the first modified frequency from the data in the first entry;
    modifying a second frequency of the second clock serving the second performance domain to the second modified frequency responsive to determining the second modified frequency from the data in the first entry, wherein the second modified frequency is different from, and other than a multiple of, the first modified frequency, and wherein the at least one additional parameter comprises one or more additional configuration parameters for the first performance domain and the second performance domain; and
    modifying additional configuration of the first performance domain and the second performance domain responsive to the additional configuration parameters.

2. The method of claim 1, wherein receiving the request comprises determining that a performance state indication has been stored in a register.

3. The method of claim 2, wherein the performance state indication is a value identifying the first entry.

4. The method of claim 1, wherein the one or more additional configuration parameters comprise programmable component configuration values.

5. The method of claim 1, wherein modifying the first frequency of the first clock comprises instructing a clock generator to reconfigure a clock input from a first input to a second input.

6. The method of claim 5, further comprising, prior to instructing the clock generator to reconfigure the clock input, determining that the first and second inputs are active.

7. The method of claim 1, wherein modifying the first frequency of the first clock comprises instructing a clock generator to reconfigure a clock divisor.

8. The method of claim 1, further comprising:
    prior to modifying the first and second frequencies, receiving a subsequent request to change the state of the device; and
    refusing the subsequent request at least until the first and second frequencies are modified.

9. A system-on-chip (SoC) comprising:
    a processor; and
    a logic circuit coupled to the processor, wherein the logic circuit is configured to:
        derive first and second frequencies in response to a request to establish a given state in the SoC, wherein the second frequency is independent from the first frequency, wherein the request identifies a first entry of a plurality of entries in a performance state table, wherein each entry of the plurality of entries stores data identifying at least the first and second frequencies, and wherein the data further specifies supply voltage magnitudes for a first performance domain served by a first clock at the first frequency and a second performance domain served by a second clock at the second frequency, and wherein the data further specifies at least one additional parameter for at least one of the first performance domain and the second performance domain;
        cause a control circuit to provide the first clock having the first frequency to the first performance domain of the SoC responsive to the data in the first entry;
        cause the control circuit to provide the second clock having the second frequency to the second performance domain of the SoC responsive to the data in the first entry, and wherein the at least one additional parameter comprises one or more additional configuration parameters for the first performance domain and the second performance domain; and
        cause additional configuration of the first performance domain and the second performance domain to be modified responsive to the additional configuration parameters.

10. The SoC of claim 9, wherein the logic circuit is further configured to:
    instruct the control circuit to select a clock input or a clock divisor specified in the table for the given state.

11. The SoC of claim 10, wherein the request comprises an indication stored in a register, and wherein the indication identifies the first entry in the table.

12. The SoC of claim 9, wherein the control circuit is further configured to provide information about the given state to a memory controller coupled to the processor.

13. A logic circuit comprising:
a power management circuit configured to:
receive a request to change a state of a device, wherein the device includes a first performance domain and a second performance domain, and wherein request identifies a first entry of a plurality of entries in a performance state table, wherein each entry of the plurality of entries is configured to store data describing parameters for at least the first performance domain and the second performance domain, wherein the parameters include at least clock frequencies and supply voltage magnitudes for the first performance domain and the second performance domain, and wherein the parameters included at least one additional parameter corresponding to at least one of the first performance domain and the second performance domain;
cause a first parameter of a first circuit serving the first performance domain to be modified to the first modified parameter responsive to the data in the first entry;
cause a second parameter of a second circuit serving a second performance domain to be modified to the second modified parameter responsive to the data in the first entry, wherein the second modified parameter is independent from the first modified parameter, and wherein the at least one additional parameter comprises one or more additional configuration parameters for the first performance domain and the second performance domain; and
cause additional configuration of the first performance domain and the second performance domain to be modified responsive to the additional configuration parameters; and
one or more programmable registers coupled to the power management circuit and configured to enable an operation of the power management circuit.

14. The logic circuit of claim 13, wherein the first parameter is a first clock frequency, the first modified parameter is a first modified clock frequency, the second parameter is a second clock frequency, and the second modified parameter is a second modified clock frequency.

15. The logic circuit of claim 13, wherein the second modified clock frequency is different from, and other than a multiple of the first modified clock frequency.

16. The logic circuit of claim 13, wherein the first parameter is a first voltage, the first modified parameter is a first modified voltage, the second parameter is a second voltage, and the second modified parameter is a second modified voltage.

17. The logic circuit of claim 13, wherein the second modified voltage is different from, and other than a multiple of the first modified voltage.

* * * * *